3,090,723
COMBATTING OF MOLLUSCS
Sebastien A. Pastac, 27 Rue Rieussec, Viroflay, France
No Drawing. Filed Sept. 6, 1960, Ser. No. 53,897
Claims priority, application France Sept. 14, 1959
12 Claims. (Cl. 167—46)

The present invention relates to the combatting of molluscs, and more particularly to a composition for combatting molluscs and to a method of using such composition for the combatting of molluscs.

Terrestrial molluscs such as slugs, snails, and the like, occupy a position of primary importance among the enemies of plant cultivation.

The presence of molluscs on earth has been verified in geological deposits of the most ancient type (and their survivance to the present time is proof of their perfect adaptability to existence on earth where they do not have dreaded natural enemies).

Birds are the principal enemies of molluscs, but since birds sleep at night when the molluscs leave their shelter to eat and destroy the plants, the chance of the birds meeting and destroying the molluscs is rather slim.

The molluscs destroy practically all substances of vegetable origin and are a tremendous nuisance to growers of various products, particularly to citrus fruit growers, the molluscs causing tremendous monetary damage to the crops and the plants themselves.

Unless special measures are taken to control the molluscs the number of molluscs per hectare can quickly grow to the millions and these molluscs can quickly destroy all the seedlings or devour all the harvest in the area. The voracity of the molluscs is enormous and in two days a mollusc will eat its own weight.

In combatting molluscs prior to the present invention the principal means used has been to distribute pastes having a bran base and containing metaldehyde. Since metaldehyde is not a very strong poison the metaldehyde was used in amounts of 5 to 10%, which in view of the large areas to be covered greatly increased the price of combatting the molluscs. Nevertheless, metaldehyde has been the primary poison used against molluscs because of its relative safety to animals and human beings. Thus, despite the fact that the efficacy of the metaldehyde depends on atmospheric conditions which permit the intoxication of the molluscs by the poison, and in many cases the metaldehyde has been totally ineffective or after the passage of time the molluscs re-establish themselves and escape the metaldehyde, the metaldehyde has nevertheless remained the primary active agent used against molluscs.

It is accordingly a primary object of the present invention to provide new agents for combatting molluscs, which agents are more effective than anything known prior to the present invention, while still being safe to human beings and other animals.

It is another object of the present invention to provide new compositions for combatting molluscs which include the new agents of the present invention and which also include metaldehyde, the metaldehyde however only being needed in much smaller amounts than when used alone since it acts synergistically with the mollusc-destroying agents of the present invention to provide a superior mollusc-destroying effect.

It is yet another object of the present invention to provide a method of treating mollusc infested areas to eliminate or at least control the molluscs.

It is yet another object of the present invention to provide a composition for combatting molluscs which not only includes the mollusc-destroying agents of the present invention but which also includes substances which have the power of attracting molluscs so that there is a greater probability of the mollusc coming in contact with the mollusc-destroying agent and therefore of the mollusc being destroyed.

Other objects and advantages of the present invention will be apparent from a further reading of the specification and of the appended claims.

With the above and other objects in view, the present invention mainly comprises a composition for combatting molluscs comprising a carrier, and an effective mollusc-destroying amount of a substance selected from the group consisting of halogenated aldehyde derivatives selected from the group consisting of the reaction product of 2–10 carbon atom halogenated aliphatic aldehyde with a compound selected from the group consisting of ammonia, hydroxylamine, aldoxime, arabinose, glucose, mannose, galactose, urethane, formamide and carbamide.

In the above composition the mollusc-destroying agent may be used in an amount as low as 0.5% by weight. The maximum amount is of course only limited by economy since excessive amounts of the agent would unnecessarily increase the cost of the composition, and as a practical matter therefore it is unnecessary to use more than 10% by weight of the mollusc-destroying agent. Most preferably the amount of the mollusc-destroying agent is between about 1 and 3% by weight.

The composition of the present invention may include in addition to the above mentioned mollusc-agents of this invention a small amount of metaldehyde which has been found to act synergistically with the mollusc-destroying agents of the invention. Whereas in normal compositions for combatting molluscs which rely solely on metaldehyde at least 5% of metaldehyde is necessary, it is possible to use as little as 0.1% of metaldehyde in combination with the above mentioned mollusc-destroying agents of this invention to achieve a mollusc-destroying effect of the metaldehyde, due to the synergistic action of the metaldehyde with the other agents. The most preferred amount of metaldehyde to be used in combination with the other agents is between about 0.3 and 3% by weight, and for reasons of economy the amount of metaldehyde should not exceed 10% by weight.

Among the halogenated aldehyde derivatives which are used as mollusc-destroying agents according to the present invention are chloral ammonia, chloral hydroxylamine, trichloracetaldoxime, arabo-chloralose, gluco-chloralose, manno-chloralose, galacto-chloralose, chloralurethane, chloralformamide, monochloralcarbamide and dichloralcarbamide.

The most preferred mollusc-destroying agent in accordance with the present invention is dichloralcarbamide also known as dichloralurea. This compound has the following formula:

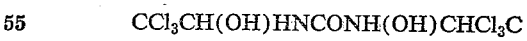
$$CCl_3CH(OH)HNCONH(OH)CHCl_3C$$

In accordance with a preferred embodiment of the present invention the composition for combatting molluscs includes in addition to the carrier, which shall be further discussed, may be a paste based on bran, or may be another powdered substance or may be a liquid carrier, and the mollusc-destroying of the present invention and possibly also metaldehyde in synergistic combination with the mollusc-destroying agents of the present invention, at least one substance adapted to attract molluscs. Such substance may be a cryptogam, preferably in dried, powdered form and in an amount of 14 to 30% by weight. Among the most suitable cryptogams are lower fungi and yeast. The composition may also include chlorophyll for the purpose of helping to attract the molluscs where they may be destroyed by the mollusc-destroying agents of the present invention.

The compositions of the present invention may be used in the form of pastes, powders, in the form of granules, or in the form of an aqueous dispersion. The compositions may contain in addition to the active mollusc-destroying agents of the present invention and possibly the addition of metaldehyde, and also possibly the addition of an agent which is adapted to attract the molluscs such as a cryptogam and possibly also chlorophyll, other products utilized for the culture and protection of plants.

The mollusc-destroying agents of the present invention have the capacity of destroying molluscs of all different varieties such as the Arionidae (*Arion rufus, A. ater, A. circumscriptus, A. hortensis, A. subfuscus, A. intermedius,* etc.) as well as various Limacudae (*Limax maximus, L. cinereoniger, L. flavus, L. rusticus,* etc.). The agents also equally destroy snails, including *Cepea hortensis, Arianta arbustorum, Helix pomatia,* etc. The agents are also effective against molluscs of the families Oncidiidae, Oriculidae, Nudibranches, Planorbidae, etc.

The mollusc-destroying agents of the present invention, and particularly dichloralcarbamide, have the important advantage of being practically totally inoffensive to man and to warm-blooded animals in general. This is a great advantages, particularly as compared to products which are based on arsenic, fluorosilicate, dieldrin, etc. which are extremely toxic substances which often cause accidents and even death of animals and human beings.

The substances which are used to attract the molluscs in accordance with the present invention so that the mollusc-destroying agents may have a greater opportunity of destroying the molluscs are primarily cryptogams, which are of the vegetable kingdom without stamens, ovules, seeds and embryos and with spores including groups such as algae and fungi, mossworts and fernworts. The preferred mollusc attracting substances of this group are the yeasts which are microorganisms of the vegetable kingdom belonging to the order of the Gumnosceos and to the family of the Saccharomycetes of which there are three classes, namely Monospora, Saccharomycetes and Schizosaccharomyces. Lower fungi are likewise preferred cryptogams which may be used for attracting molluscs so that the same may be destroyed by the mollusc-destroying agents of the invention.

The cryptogams such as the yeasts and the mushrooms which are used to attract the molluscs may, along with the mollusc-destroying agents of the present invention, be incorporated into a paste, into a cake of alfalfa, of bran, or the like. These cryptogams have been found to have the power of attracting molluscs from a distance of several meters, and in the case of mushrooms even the limace Limax which is found always in the earth where it devours roots, comes to the surface drawn by the odor of the yeast or mushroom.

The compositions may be made into the form of a paste and spread on the soil whereby when the molluscs come in contact with the composition, perhaps drawn thereto by means of the substances for attracting the same, the mollusc will be destroyed by means of the active agents of the invention.

It is also possible in accordance with the present invention to prepare compositions of a type which may be spread on the source of nourishment of the molluscs, that is on the plants which themselves draw the molluscs as well as on the earth and on the debris of vegetable matter, etc. Compositions of this type may in general be in any of two forms, that is in the form of a liquid (solution or suspension) or in the form of a powder. In the case of a liquid composition, the active substances of the present invention are either dissolved in a suitable solvent or suspended in an appropriate liquid. In the case of a powder composition the active agents are dispersed on various powder carriers. In addition to the active substance dispersed in the liquid or through the powdered carrier, the composition may include cryptogam for attracting the molluscs as well as chlorophyll which also serves to attract the molluscs.

In addition it is possible to incorporate into the composition substances such as gluten, beet sugar waste, and their extracts, yeast, etc. or liquid extracts of the same.

For purposes of attraction of the molluscs the cryptogams are generally utilized in the form of a dry powder in an amount of approximately 14 to 30% by weight. The amount can of course be smaller, in which case the power of attraction is less, and there is actually no maximum amount of cryptogams which may be used, except that the cost of the product may be increased undesirably by use of too much of the cryptogams.

The gluten extract and the beet sugar extract are utilized in liquid form in the preparation of liquid compositions in accordance with the invention.

It may also be desirable to include in the compositions of the present invention mold-inhibiting agents which may be of any type that are not repulsive to molluscs as for example insoluble fluosilicates such as barium fluosilicate.

The following examples are given to further illustrate the present invention. The scope of the invention is not however meant to be limited to the specific details of the examples.

*Example I*

A mixture is prepared of the following composition:

| | Percent |
|---|---|
| Glucochloralose | 3 |
| Mycelium of *Penicillium notatum* | 30 |
| Alfafa flour | 20 |
| Chalk | 36 |
| Ochre | 10 |
| Metaldehyde | 1 |

A paste of this type will attract molluscs and if it comes in contact with the molluscs, and particularly if eaten by the molluscs, will destroy the same.

*Example II*

A mixture is prepared of the following composition:

| | Percent |
|---|---|
| Dichloralcarbamide | 1 |
| Yeast | 14 |
| Oil cake | 14 |
| Alfalfa flour | 7 |
| Chalk | 30 |
| Ochre | 3.5 |
| Metaldehyde | 0.5 |

This composition may be spread on the ground and when eaten or contacted by a snail, slug or the like, will destroy the same.

*Example III*

A mollusc-destroying preparation is prepared of the following composition:

| | Percent |
|---|---|
| Dichloralurea | 1 |
| Dry yeast | 14 |
| Linseed press cakes | 14 |
| Alfalfa green flour | 7 |
| Chalk | 60 |
| Green ochre | 3.5 |
| Metaldehyde | 0.5 |

The above composition is highly effective in destroying molluscs such as snails and slugs.

*Example IV*

A mollusc-destroying composition is prepared as follows:

6 parts of dichloralcarbamide are dissolved in 55 parts of alcohol. One part of metaldehyde is dissolved in 36 parts of dimethyl sulfoxide. The solutions are mixed and two parts of a wetting agent soluble in alcohol are added.

At the time of use the composition is mixed with the necessary quantity of water and the product is applied by spraying the liquid.

The above composition may be applied directly to trees, vegetables, tobacco, the earth, etc. so that when the molluscs come in contact with whatever area is treated with the composition the molluscs are killed by the same.

*Example V*

85 parts of yeast gruel is mixed with 3 parts of a wetting agent and 12 parts of dichloralcarbamide, all finely pulverized. At the time of use the necessary quantity of water is mixed with the composition and the composition including the water is spread by spraying or some other method of finely dividing the liquid composition.

*Example VI*

6 parts of dichloralcarbamide are pulverized and ground with 2 parts of metaldehyde to which is added 2 parts of a wetting agent. The mixture is then further mixed and distributed in 90 parts of gluten extract.

At the time of use the necessary quantity of water is mixed with the composition and the composition is spread by spraying of the liquid.

*Example VII*

A dry powder composition is prepared of the following ingredients:

| | Percent |
|---|---|
| Dichloralcarbamide | 1.5 |
| Yeast | 11 |
| Oil cake | 11 |
| Bran | 11 |
| Alfalfa | 2 |
| Ochre | 2 |
| Metaldehyde | 0.5 |
| Chalk | 61 |

This composition may be used in the form of a dry powder or it may be mixed with water to make a paste. In either form the composition is an effective mollusc-destroying agent.

*Example VIII*

A composition is prepared of the following ingredients:

| | Percent |
|---|---|
| Dichloralcarbamide | 1.75 |
| Bran | 20 |
| Oil cake | 13 |
| Alfalfa | 2 |
| Ochre | 2.50 |
| Metaldehyde | 0.75 |
| Chalk | 60 |

This composition may be used in the form of a powder or it may be mixed with water to form a paste.

The compositions of the present invention in addition to being useful for the destruction of terrestrial molluscs have also been found to be most effective in destroying aquatic molluscs, that is molluscs inhabiting fresh waters of lakes, streams and rivers, and accordingly the present invention is further directed to the destruction of such aquatic molluscs.

Studies have established that on the shores of lakes or wherever the level of the water is variable (notably on the shores of Lake Tanganyika) there are molluscs which live on the earth or in the water depending on the circumstances, so that there is no clear separation between molluscs which live on earth and which live in water.

Besides the destruction which the molluscs cause to crops, in certain countries the molluscs present a great danger to public health because they are intermediate hosts to parasites which attack man and domestic animals and carry the sickness known under the name of "bilharziosis."

This name was given to the sickness in honor of Prof. Bilharz who during 1852 studied and described the sheep parasite "*Distomum haematobium*."

It was only in 1913 that the Japanse scientists Miyari and Suzuka in studying "*Schistosoma japonicum*" which is a trematode, found that fresh water molluscs are the intermediate hosts of the parasite. Since that time, the molluscs have been the object of systematic zoological studies which were primarily interested in the form and color of their shells. Since 1913, molluscs have been the object of publications by biologists and pathologists.

The molluscs which are carriers of the trematodes belong to the large family of Planorbides, although not exclusively, and other molluscs can be hosts to the parasites.

Actually malaria has been fought effectively by destroying with modern insecticides the mosquitos of the genus anopheles which are the intermediate hosts of the plasmodium of malaria.

In the same way the present invention provides for war against the bilharzia by utilizing the active product of the present invention for destroying the molluscs which are the carriers.

These molluscs belong to the groups of limnees, bullines, planorbes, onchomelanies, bithinies, etc. In general the classification according to the variable characteristics of the molluscs is of no interest because all of the molluscs can be infective; schistosomes have even been found in the mummies of the pharaohs of Egypt.

Up to the present, there has been no satisfactory means to effectively fight these molluscs, the number of persons suffering from bilhariosis in China alone being about 100,000,000. Bilhariosis is also found in Japan, in Africa, in tropical Americas, in the Philippines and in other countries of the Pacific.

Until the present time the battle against the schistosomes or more exactly against their hosts, the molluscs, has been unsuccessful. Recommendations have been made to add lime or mineral salts to the waters, copper sulfate, zinc sulfate, etc.

It has been found that the dichloralcarbamide and the other substances of the present invention provide a new type of product which permits destruction of aquatic molluscs in a highly effective manner and without any danger to man or domestic animals.

This will be more fully explained by the examples which follow which examples show the new technique of using the active substances of the present invention (in solution, suspension, emulsion, paste, or precipitated on a support) to destroy the aquatic molluscs.

*Example IX*

Dichloralcarbamide is dissolved in a suitable solvent (ethyl alcohol) and a wetting agent is added to the solution. The solution is poured into a body of water. The dichloralcarbamide is dispersed and adheres to the aquatic plants and is deposited in the mud. When the molluscs come in contact with the same, they are destroyed.

*Example X*

An acetone solution of 4% dichloralcarbamide is mixed with 1% of metaldehyde in powder form or in solution. At the time of use, it is mixed with water and agitated and the milky suspension is poured into a body of water infected with molluscs for the purpose of destroying the same.

*Example XI*

The above solution of dischloralcarbamide is dispersed on an inert support of high specific gravity for example barium carbonate or barium sulfonate (with or without the addition of metaldehyde). Water is added which causes precipitation of the dichloralcarbamide onto the support.

This product is dispersed in the water and is quickly deposited so that it resists entrainment by the water current.

Example XII

A paste is made which may be used to rid a body of water of molluscs, the paste having the following composition:

| | Percent |
|---|---|
| Dichloralcarbamide | 2 |
| Linseed oil cake | 14 |
| Yeast | 14 |
| Water repelling agglomerant | 5 |
| Chalk and sand | 64.5 |
| Metaldehyde | 0.5 |

Example XIII

Crushed biscuits are prepared comprising a mixture of any of the preceding formulas with the addition of a water repelling substance. A paste or cake of this composition breaks up very slowly in water and attacks and kills molluscs.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Composition for combatting molluscs, comprising a carrier; a wetting agent; and at least 0.5% by weight of a compound selected from the group consisting of chloral-ammonia, chloral-hydroxylamine, trichloracetaldoxamine, arabo-chloralose, gluco-choralose, manno-chloralose, galacto-chloralose, chloral-urethane, chloral-formamide, monochloralcarbamide and dichloralcarbamide.

2. Composition for combatting molluscs, comprising a carrier; at least 0.5% by weight of a compound selected from the group consisting of chloralammonia, chloral-hydroxylamine, trichloracetaldoxamine, arabo-chloralose, gluco-chloralose, manno-chloralose, galacto-chloralose, chloral-urethane, chloral-formamide, monochloralcarbamide and dichloralcarbamide; and metaldehyde in an amount of about 0.1–10% by weight.

3. Composition for combatting molluscs, comprising a carrier; a wetting agent; and at least 0.5% by weight of dichloralcarbamide.

4. Composition for combatting molluscs, comprising a carrier; at least 0.5% by weight of dichloralcarbamide; and metaldehyde in an amount of about 0.1–10% by weight.

5. Composition for combatting molluscs, comprising a carrier; a cryptogam as an attractant for molluscs; and at least 0.5% by weight of a compound selected from the group consisting of chloral-ammonia, chloral-hydroxylamine, trichloracetaldoxamine, arabo-chloralose, gluco-chloralose, manno-chloralose, galacto-chloralose, chloral-urethane, chloral-formamide, monochloralcarbamide and dichloralcarbamide.

6. Composition for combatting molluscs, comprising a carrier; a cryptogam as an attractant for molluscs; at least 0.5% by weight of a compound selected from the group consisting of chloral-ammonia, chloralhydroxylamine, trichloracetaldoxamine, arabo-chloralose, gluco-chloralose, manno-chloralose, galacto-chloralose, chloral-urethane, chloral-formamide, monochloralcarbamide and dichloralcarbamide; and metaldehyde in an amount of about 0.1–10% by weight.

7. Composition for combatting molluscs, comprising a carrier; a cryptogam as an attractant for molluscs; and at least 0.5% by weight of dichloralcarbamide.

8. Composition for combatting molluscs, comprising a carrier; a cryptogam as an attractant for molluscs; at least 0.5% by weight of dichloralcarbamide; and metaldehyde in an amount of about 0.1–10% by weight.

9. Method of combatting plant-destroying molluscs, which comprises applying to an area infested with molluscs a composition comprising a carrier, and at least 0.5% by weight of a compound selected from the group consisting of chloral-ammonia, chloral-hydroxylamine, trichloracetaldoxamine, arabo-chloralose, gluco-chloralose, manno-chloralose, galacto-chloralose, chloral-urethane, chloral-formamide, monochloralcarbamide and dichloralcarbamide.

10. Method of combatting plant-destroying molluscs, which comprises applying to an area infested with molluscs a composition comprising a carrier, metaldehyde in an amount of about 0.1–10% by weight, and at least 0.5% by weight of a compound selected from the group consisting of chloral-ammonia, chloral-hydroxylamine, trichloracetaldoxamine, arabo-chloralose, gluco-chloralose, manno-chloralose, galacto-chloralose, chloral-urethane, chloral-formamide, monochloralcarbamide and dichloralcarbamide.

11. Method of combatting plant-destroying molluscs, which comprises applying to an area infested with molluscs a composition comprising a carrier, a cryptogam as an attractant for molluscs, and at least 0.5% by weight of a compound selected from the group consisting of chloral-ammonia, chloral-hydroxylamine, trichloracetaldoxamine, arabo-chloralose, gluco-chloralose, manno-chloralose, galacto-chloralose, chloral-urethane, chloral-formamide, monochloralcarbamide and dichloralcarbamide.

12. Method of combatting plant-destroying molluscs, which comprises applying to an area infested with molluscs a composition comprising a carrier, a cryptogam as an attractant for molluscs, metaldehyde in an amount of about 0.1–10% by weight, and at least 0.5% by weight of a compound selected from the group consisting of chloral-ammonia, chloral-hydroxylamine, trichloracetaldoxamine, arabo-chloralose, gluco-chloralose, manno-chloralose, galacto-chloralose, chloral-urethane, chloral-formamide, monochloralcarbamide and dichloralcarbamide.

References Cited in the file of this patent

FOREIGN PATENTS 498,498     Great Britain _____ Apr. 21, 1937

OTHER REFERENCES

King: U.S. Dept. Agr. Handbook No. 69, page 56 (item 1234), 1954.

Jacobsen: Annalen der Chemie und Pharmacie, 157, 247 (1871).